Oct. 8, 1968   J. W. LEAHEY ET AL   3,404,472
FILM SUPPORT ASSEMBLY
Filed July 21, 1966

INVENTORS
John W. Leahey
Vernon D. Turner
By
Pearson + Pearson
ATTORNEYS

United States Patent Office 3,404,472
Patented Oct. 8, 1968

3,404,472
FILM SUPPORT ASSEMBLY
John W. Leahey, Lowell, and Vernon D. Turner, Lincoln, Mass., assignors to Lowell Technological Institute Research Foundation, Lowell Mass., a foundation of Massachusetts
Filed July 21, 1966, Ser. No. 566,885
4 Claims. (Cl. 40—106.1)

ABSTRACT OF THE DISCLOSURE

A rotatable and translatable filmstrip holding device for use in a photometer. The device includes a pair of parallel longitudinal bars forming part of a support structure. The support guides film by means of stepped rollers and adjustable gravity rollers, and the film is held in a flat position between transparent plates so that minute details on microfilm and X-ray film can be studied. There is further provided a lock means consisting of a pair of horizontally adjustable eccentrically mounted rubber rollers at both ends of the support assembly for holding the film firmly in place.

---

This invention relates to film viewing apparatus and more particularly to an improved film support assembly for reading and measuring film, as the assembly is detachably held in a rotatable and translatable apparatus, mounted on a microphotometer or the like.

The apparatus of the invention is primarily used in photo interpretation, or for studying the most minute details of images on microfilm and X-ray film. Typical applications would include use in study of film of anatomical structure and the study of film of geophysical structure. In making these studies, it is most desirable that the various types of images to be studied be easily carried through the viewing apparatus, be easily inserted in the apparatus, be held firmly in a single plane while under study, and be quickly and easily replaced with either another section of a same film (as when a roll of film is involved) or be quickly replaceable with a different size slide or the like.

Thus it is an object of the instant invention to provide an improved film support assembly that is easily removable from a rotatable, translatable apparatus for changing from study of film rolls to study of slides and also convenient for receiving and processing rolls of film.

Another object of the invention is to provide a film support assembly through which film is easily threaded.

It is a further object of the invention to provide an apparatus wherein the film is conveniently held in flat, easily interpretable position by a novel and removable film support assembly.

Other objects and advantages of the invention are set forth below or are obvious to those skilled in the art from a study of the specification.

In this application and accompanying drawing a preferred embodiment of the invention has been shown and described and various alternatives and modifications thereof have been suggested, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

Figure 1:
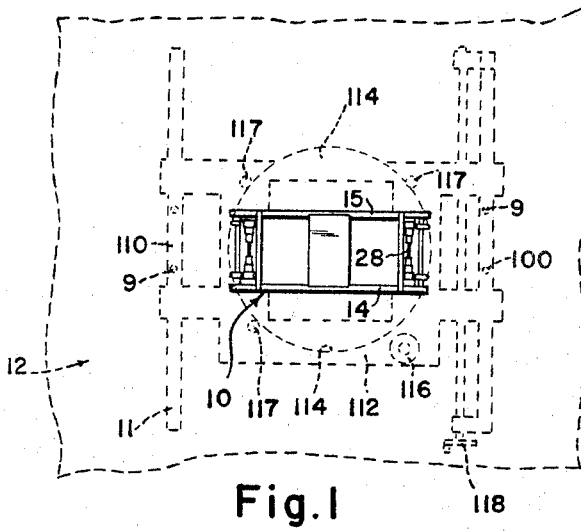
FIGURE 1 is a top view of the apparatus of the invention mounted on a microphotometer, the support assembly being shown in full lines.

Referring to FIGURE 1, it is seen that a film support assembly 10, shown in a solid line, is placed in a rotatable and translatable apparatus 11, mounted by screws 9 on a microphotometer 12. The apparatus 11 and photometer 12 are shown in dotted lines because such apparatus is already known to the art. The apparatus 11 consists of a pair of parallel rails 100 and 110 upon which a carriage 112 is slidably translatable. Carriage 112 supports a circular rotatable ring 114 which can be turned by an adjusting knob 116 and locked in place by locks 117 when film to be studied is in a satisfactory position. A thrust screw 118 provides means to move carriage 112 along rails 100 and 110. Thus film held in assembly 10 can be studied from a variety of angles.

The film support assembly 10 includes a skeletonized framework 13, formed by two parallel longitudinally extending side bars 14 and 15, each having the opposite terminal ends 16 and 17 thereof in a first horizontal plane, downwardly inclined portions 18 and 19, and a horizontal intermediate portion 20, the latter being in a second horizontal plane below, and in parallelism with said first horizontal plane. The horizontal portion 20, of each side bar, 14 and 15, has an inwardly facing recess, or channel, 21, the oppositely disposed recesses 21 receiving the transparent plates 22 and 24, which are preferably of glass. The film overlies the lower plate and is flattened by the upper plate by force of gravity, both plates being vertically removable or insertable.

Lower plate 22 is about 1/32 inch thick and has a flat surface against which heavier transparent plate 24 holds film flat while the film is being studied.

At each end of support assembly 10, and immediately attached to side bars 14 and 15, are film keeper assemblies 26. These keeper assemblies provide means for alternate movement, and locking into position of, the film to be studied. Keeper assemblies 26 are in this description illustrative of a particular apparatus adapted to hold 8, 16, 35, and 70 mm. roll film as well as variously sized photographic plates.

Figure 2:
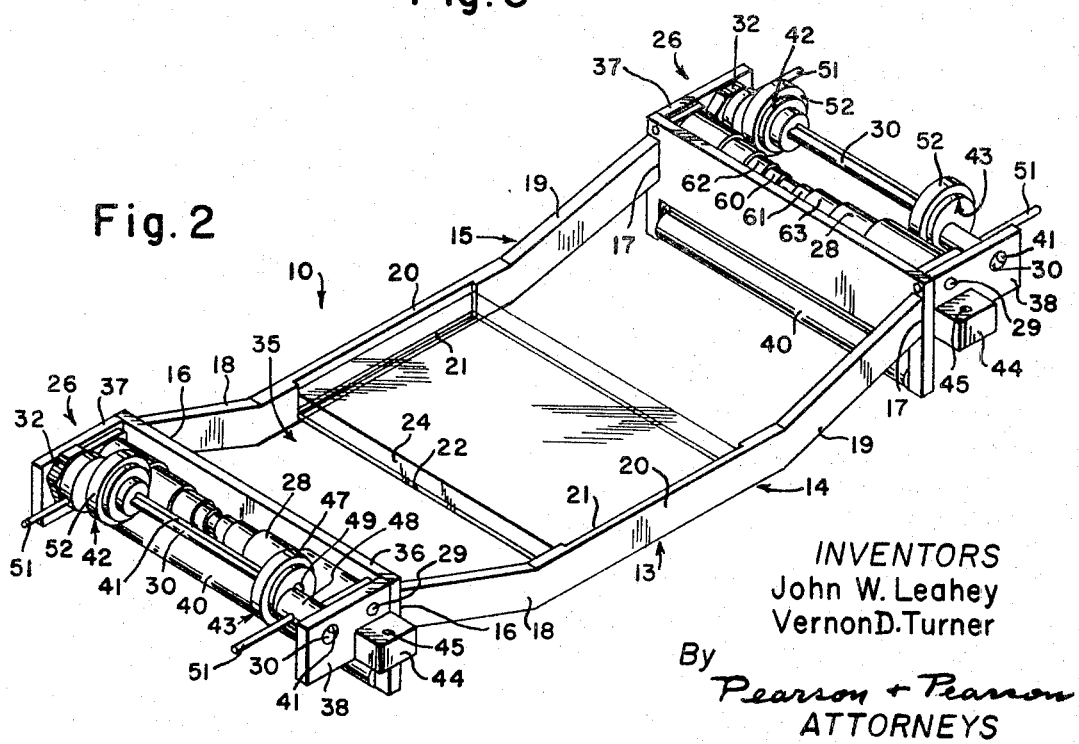
FIGURE 2 is a perspective view of the support assembly of the invention, on an enlarged scale.

Referring to FIGURE 2, it is seen that each of keeper assemblies 26 comprise a stepped film centering roller 28 fast to a shaft 29, the roller 28 having varying diameters, symetrically arranged to provide film paths for films of varying width, and a film-lock shaft 30. Film lock nuts 32 are positioned for co-action with operating cylinders 33 mounted on both film-lock shafts 30. Keeper assemblies 26 each include a laterally extending framework end piece 36 secured to the terminal ends 16 or 17 of side bars 14 and 15, to define the open space 35. Each keeper assembly 26 also includes a pair of side frame pieces 37 and 38, in extension of side bars 14 and 15, and in the above mentioned first horizontal plane, in which the shafts 29 and 30 are journalled.

Figure 3:
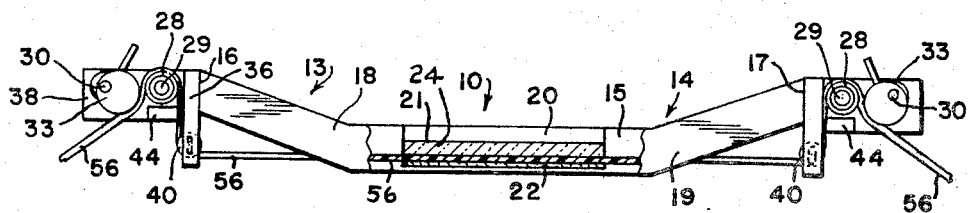
FIGURE 3 is a side elevation, partially schematic, of the assembly shown in FIGURE 2 with a sheet of film positioned therein.

Each end piece 36, although generally rectangular in shape, has a cut-out section in the bottom thereof wherein a vertically movable, gravity adjustable roller 40 is journalled, thereby foming means to guide and tension film threaded through the apparatus as seen in FIGURE 3. Projecting brackets 44, each on the outer flank of a side frame piece 38, form means for attaching support assembly 10 to the rotatable ring 114 by captive screws positioned at 45 in brackets 44.

Each film lock shaft 30 includes a key way 41, upon which a pair of film locks 42 and 43, each in the form of an eccentric roll 47 fast to a sleeve 48, and having a key 49 fitting key way 41, is longitudinally slidable. A film lock lever 51 is fast to at least one sleeve 48, and each roll 47 is provided with a resilient yieldable ring 52, preferably of rubber, for clamping against a film when the film lock lever is turned. The film centering roller 28 is provided with oppositely disposed pairs of stepped faces, such as 60 and 61, 62 and 63, etc., the outer faces being arranged to receive and center relatively wide film, and the inner pairs of faces being arranged to receive and center narrower film.

Figure 4:
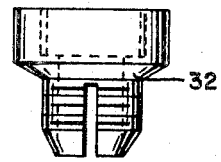
FIGURE 4 is an elevation of a lock-nut useful with the appartus of the invention.

A particularly advantageous manner of locking shaft 30 is to utilize a split nut 32 as shown in more detail in FIGURE 4.

In threading the apparatus for study of roll film, captive screws positioned at 45 are loosened and the film locks 42 and 43 at each end are slid along shafts 30 to conform the particular width of film to be studied. This is done with film lock levers 51 retracted and with the film locks retracted from roller 28. The eccentric mounting of the film locks is particularly important in allowing sufficient room for easy threading of film.

Film 56 (shown in FIGURE 3) is placed in position with its emulsion-coated side facing downwardly, care being taken to position film 56 properly for guidance over film-centering rollers 28 and under the rollers 40. Captive screws 45 are then tightened. At this point, levers 51 are pivoted to clamp the resilient faces of the film locks 42 and 43 against the film trained over roller 28. The plane of the film is horizontal and generally at the level of the upper face of the lower plate 22. The upper plate 24 is then inserted into the oppositely disposed recesses 21 of side bars 14 and 15. In practice, this heavier and thicker top plate 24 is especially desirable when its mass is necessary for holding a mutilated or odd-sized film in a flat position.

The entire assembly is then replaced within the rotatable ring 114 of the apparatus 11 and the film is freed for movement as desired by pivoting film lock levers 51 and lifting plate 24 and thereby providing free movement of the film over film centering rollers 28 and under rollers 40.

What is claimed is:

1. In combination with a film reading device of the type mountable on a photometer and having a translatable carriage with a rotatable ring: a film support assembly comprising
   (a) a framework formed by a pair of parallel longitudinal bars, each having the terminal ends thereof in a first horizontal plane, and each having the intermediate portions thereof extending horizontally in parallelism with, but in a plane below, said horizontal plane, a pair of laterally extending end pieces, each secured to, and connecting, the adjacent terminal ends of bars to define an open space therewith;
   (b) a pair of oppositely disposed recesses, each in the intermediate portion of the said bars;
   (c) at least one horizontally disposed transparent plate received in said recesses and extending laterally through said space and being vertically movable in said recesses;
   (d) and film-keeping means on each said end piece, for clamping a continuous strip film in position while said strip is supported between said glass plates for viewing.

2. A combination as defined in claim 1, wherein two transparent plates are received in said recesses, one plate on top of the other, the lower plate being a relatively thin plate forming means to support a film, and the upper plate being a relatively thick plate forming means to press a film flat against said lower plate.

3. In combination with a film reading device of the type mountable on a photometer and having a translatable carriage with a rotatable ring: a film support assembly comprising
   (a) a framework formed by a pair of parallel longitudinal bars, each having the terminal ends thereof in a first horizontal plane, and each having the intermediate portions thereof extending horizontally in parallelism with, but in a plane below, said horizontal plane, a pair of laterally extending end pieces, each secured to, and connecting, the adjacent terminal ends of said bars to define an open space therewith;
   (b) a pair of oppositely disposed recesses, each in the intermediate portion of the said bars;
   (c) at least one horizontally disposed transparent plate received in said recesses and extending laterally through said space and being vertically movable in said recesses;
   (d) and film-keeping means on each said end piece, for clamping a continuous strip film in position while said strip is supported between said glass plates for viewing, said film-keeping means comprising two film keeper assemblies, one at each end of said support assembly, each said keeper assembly comprising
   (1) a film centering roller
   (2) a shaft parallel to, and spaced from, said roller
   (3) a pair of resilient faced, film locks mounted eccentrically on said shaft, and laterally slidable thereon for clamping a film against said roller, and
   (4) means to retain said film locks against said film centering roller during viewing of a film.

4. Apparatus as defined in claim 3, wherein said film centering roller is stepped and has a plurality of different diameters symmetrically arranged to provide support and guide means for films of different widths.

References Cited

UNITED STATES PATENTS

| | | | |
|---|---|---|---|
| 2,800,733 | 7/1957 | Chevillon | 40—86 X |
| 3,102,202 | 8/1963 | Sweet | 88—14 X |
| 3,229,397 | 1/1966 | Shaw | 40—86 |

FOREIGN PATENTS

| | | |
|---|---|---|
| 675,055 | 4/1939 | Germany. |

EUGENE R. CAPOZIO, *Primary Examiner.*

R. CARTER, *Assistant Examiner.*